March 6, 1962 W. E. REASER 3,023,548
AUTOMATIC CONTOUR EDGE GRINDER
Filed Oct. 6, 1960 6 Sheets-Sheet 1

INVENTOR.
WARREN E. REASER
BY
Owen & Owen

March 6, 1962 W. E. REASER 3,023,548
AUTOMATIC CONTOUR EDGE GRINDER
Filed Oct. 6, 1960 6 Sheets-Sheet 2

INVENTOR.
WARREN E. REASER
BY
Owen & Owen

INVENTOR.
WARREN E. REASER
BY
Owen & Owen

March 6, 1962 W. E. REASER 3,023,548
AUTOMATIC CONTOUR EDGE GRINDER
Filed Oct. 6, 1960 6 Sheets-Sheet 5

INVENTOR.
WARREN E. REASER
BY
Owen & Owen

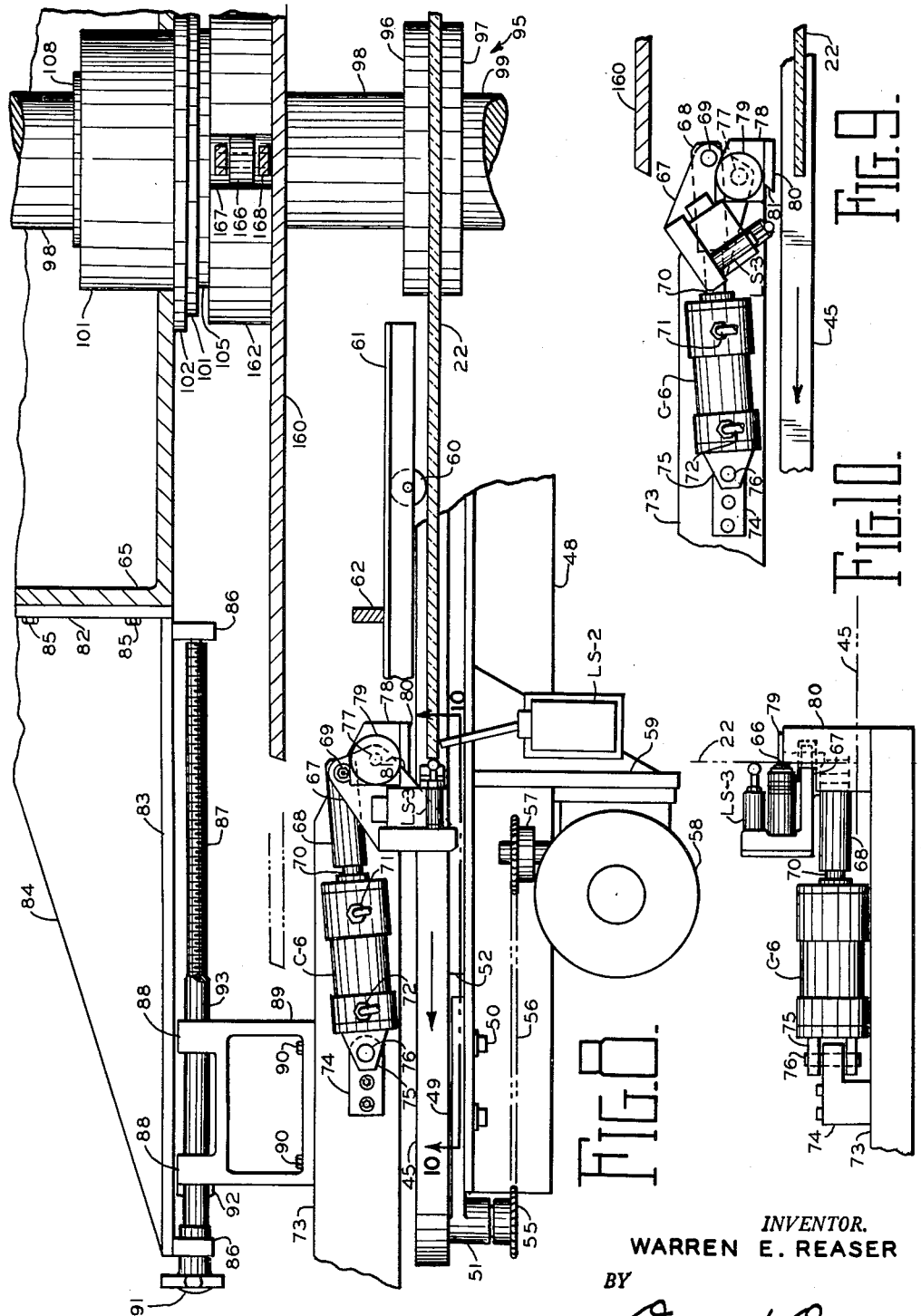

United States Patent Office 3,023,548
Patented Mar. 6, 1962

3,023,548
AUTOMATIC CONTOUR EDGE GRINDER
Warren E. Reaser, Toledo, Ohio, assignor to Sun Tool and Machine Company, Toledo, Ohio, a corporation of Ohio
Filed Oct. 6, 1960, Ser. No. 60,955
13 Claims. (Cl. 51—101)

This invention relates to an automatic contour edge grinder particularly designed for automatically grinding edges of contoured sheets or plates of glass and more particularly to an edge grinder which automatically feeds a plate of glass into edge grinding position as soon as a previous plate has been ground and removed from the edge grinding position.

Pattern cut window blanks are customarily cut by hand or automatically to a rough approximation of the finished profile of the plates of glass, and the cutting operation produces sharp edges on the glass. It is necessary to grind these edges to prevent the creation of stress points which might cause fracture of the plate. The cutting operation is usually done quite quickly, and a high speed production machine for edge grinding is needed to keep pace with a high volume supply of cut blanks.

Because high speed production edge grinding machines are designed to grind the edges of the glass blanks at the highest possible rate and to achieve the highest possible production, it is necessary to reduce the time during which the grinding wheels are not actually gridning the edge of the glass plates. The ultimate in such a high production machine is for the grinding wheels to commence grinding the edge of a glass plate at the very instant they leave the edge of a previously finished ground plate as in the case where the plates are in contact with one another and present a substantially continuous edge to the grinding wheels. However, because of the irregular shapes of the blanks, the glass plates cannot be maintained in contact with one another during grinding, and each must be fed sequentially to the grinding wheels instead. Thus a certain amount of time is lost in prepositioning the plates and moving them into and out of contact with the grinding wheels.

An edge grinding machine utilizes a clamping device to hold a glass plate while the edges are being ground, and the plate is removed from the clamping device after the grinding operation either by hand or by gravity. However, it is often necessary for a glass plate to leave a grinding machine along a definite path for subsequent processing, such as washing, and many times the glass plate must leave the discharge side of the grinding machine along the same path as it entered the oppositely disposed receiving side of the machine in order for the machine to be incorporated into a fully automatic production line.

Another problem arises when an edge grinding machine is part of a high volume production line which necessitates the moving of each glass plate along a path which is angularly disposed to horizontal because both an edge and a surface of each plate must be supported during movement along this path. Also, the supports must be moved out of engagement with both the surface and the edge when the plate is clamped in the machine to prevent marking of the plate as it is rotated during grinding.

It is, therefore, the principal object of this invention to provide an apparatus for automatically grinding the edge of a pattern cut glass plate or blank in which the feeding time is reduced to a minimum.

A further object of the invention is to provide apparatus for automatically feeding glass plates to a contour edge grinding machine along a definite path and removing a finished ground plate therefrom along a continuation of that path.

A still further object of the invention is to provide apparatus for moving glass plates into and out of a contour edge grinder along a path that is angularly disposed to horizontal while supporting both a surface and an edge of each plate, and means for moving the apparatus out of plate engagement during grinding.

Other and more specific objects and advantages of the invention will be better understood from the following specification and from the drawings in which:

FIG. 8 is a fragmentary sectional view taken along the line 8—8 of FIG. 3;

FIG. 9 is a fragmentary sectional view of a portion of the apparatus shown in FIG. 8 in retracted position; and FIG. 10 is a fragmentary detailed view taken along the line 10—10 of FIG. 8.

Figure 1:
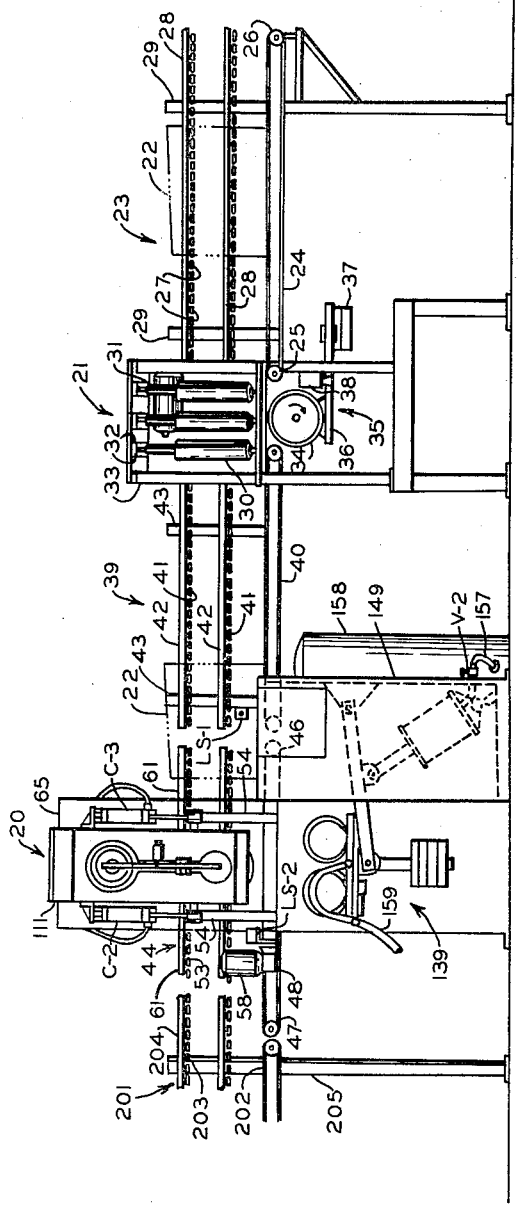
FIG. 1 is a front view in elevation of an automatic edge grinder embodying the invention.

The apparatus embodying the invention comprises a contour grinding device generally indicated at 20 and a bottom edge grinder generally indicated at 21 in FIG. 1. Inasmuch as the bottom edge of a glass plate 22, indicated by the dotted lines in FIG. 1, is finally supported in a frame, it is necessary for this edge to be rough ground only and this is done by the bottom edge grinder 21. All the remaining edges of the glass plate 22 must be both rough and finish ground and this is performed in the contour edge grinder 20.

The bottom edge grinder 21 is supplied from a loading conveyor 23 which includes an endless belt 24 mounted upon an idler wheel 25 and upon a suitable driving wheel 26. The belt 24 is driven at a constant speed by its motor (not shown) to supply plates 22 to the bottom edge grinder 21.

The glass plates 22 may either be handled manually or by means of a suitable automatic device which moves them to the conveyor 23. The bottom edge of each glass plate 22 rests on the belt 24 and one surface of the glass plate 22 contacts a plurality of idler rollers 27 carried by a pair of longitudinally extending angle irons 28. A support frame 29 mounts the angle irons 28 and is tilted backwardly so that the glass plates 22 riding on the belt 24 lie backwardly against the idler rollers 27.

The bottom edge grinder 21 has a plurality of relatively soft rubber rollers 30 which hold the plates 22 during the grinding of their bottom edges. The rollers 30 are mounted in series upon shafts 31 journaled in spring pressed bearing blocks 32 which are urged inwardly toward the plane of the plate 22 by suitable compression springs which engage the bearing blocks 32 at each end of the shafts 31.

The soft rubber rollers 30, shafts 31, and bearing blocks 32 are mounted by means of a suitable frame 33 above a rough grinding wheel 34 which is biased upwardly into engagement with the bottom edge of the glass plates 22 by a suitable lever device 35. Thus irregularities on the under edge of the glass plate 22 will not cause it to be displaced upwardly along the axis of the rollers 30.

The lever device 35 comprises a longitudinally extending arm 36 upon which the grinding wheel 34 and its driving motor are mounted as shown in FIG. 1. One end of the arm 35 carries counterweights 37, and the arm 36 is pivoted about a support 38 which is located between the counterweight 37 and the grinding wheel 34. The pressure exerted by the grinding wheel 34 against the bottom edge of the glass plate 22 may be varied by changing the weights 37 on the end of the arm 36. The grinding wheel 34 is constantly driven in a clockwise direction, indicated by the arrow in FIG. 1, and the glass is moved across the wheel by means of the belt 24 until the glass 22 has moved a sufficient distance that its trailing corner is moved out of engagement with the belt 24.

Glass sheet 22 is moved the last increment across the grinding wheel 34 and transported away from the bottom edge grinder 21 by means of a transfer conveyor generally indicated by the reference number 39 in FIG. 1. The conveyor 39 is similar in construction to conveyor 23 in that it comprises a belt 40 which engages the bottom edge of the glass plate 22 that has been rough ground by the grinder 21. The surface of the glass plate 22 is in contact with idler rollers 41 carried by angle irons 42 that are mounted on the frames 43 and tilted rearwardly in order to insure contact between the surface of the glass plate 22 and the rollers 41.

The transfer conveyor 39 moves each plate 22 to the rotary grinding machine 20 and when the plate 22 has reached a point immediately adjacent the intake side of the grinding machine 20, the leading edge of the plate 22 trips a limit switch LS–1 that is incorporated in the control circuit of the grinder 20. The tripping of the limit switch LS–1 signals the handling means at the intake end of the loading conveyor 23 to place another plate on the belt 24.

If the grinder 20 is empty, the transfer conveyor 39 will move the plate 22 directly thereinto without stopping. However, if a plate is already in the grinder 20, the limit switch LS–1 will be actuated in a manner which will be described later and the tripping of the limit switch LS–1 will stop the movement of the belt 40 as well as the belt 24 until the plate that is in the grinder 20 has been discharged from the exit end thereof.

The tripping of the limit switch LS–1 when it has been actuated by a plate in the grinder 20 will, nevertheless, signal the handling device at the loading end of the conveyor 23 that the next plate should be placed on the belt 24. However, the belt 24 has been stopped by the actuation of limit switch LS–1, and the next plate will not move. When the plate that is in the grinder 20 is discharged from the exit end thereof, the belts 24 and 40 are again started in a manner which will be described later, and the next plate is moved through the grinder 21 onto the belt 40.

Figure 2:
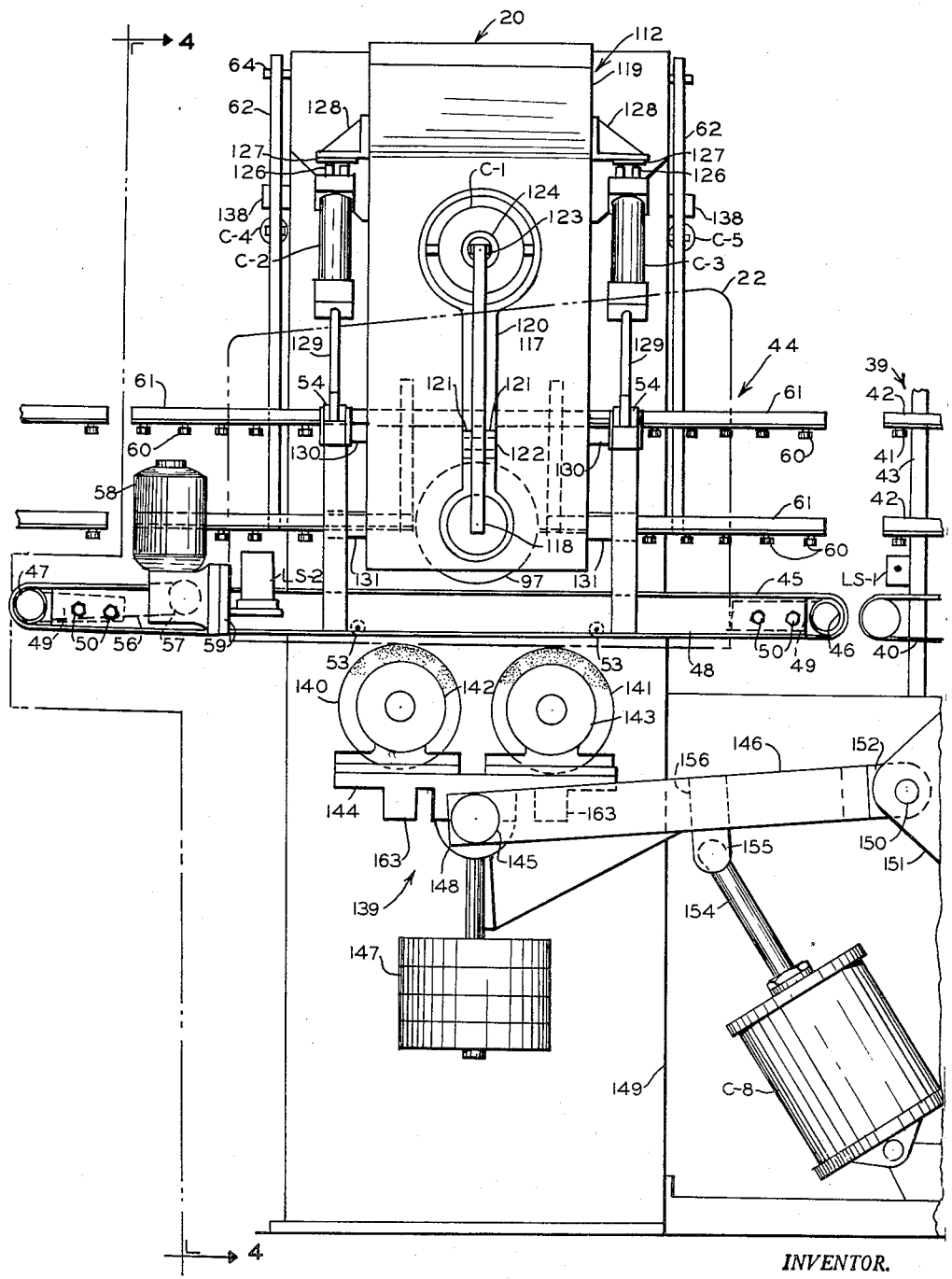
FIG. 2 is a front view in elevation of a part of the apparatus shown in FIG. 1 as designed for grinding three of the edges of the glass plates and shown on an enlarged scale.

As shown in FIG. 2, the grinder 20 is fed by means of a conveyor 44 extending therethrough which not only carries the glass plates 22 into the intake end of the grinder 20, but also removes the plates 22 from the discharge end thereof. The conveyor 44 is similar to conveyors 23 and 39 in that it comprises a belt 45 mounted upon an idler wheel 46 and a driving wheel 47. Both the idler wheel 46 and the driving wheel 47 are carried at oppositely disposed ends of a support 48 by mounting brackets 49 secured to the support 48 by bolts 50.

Figure 3:
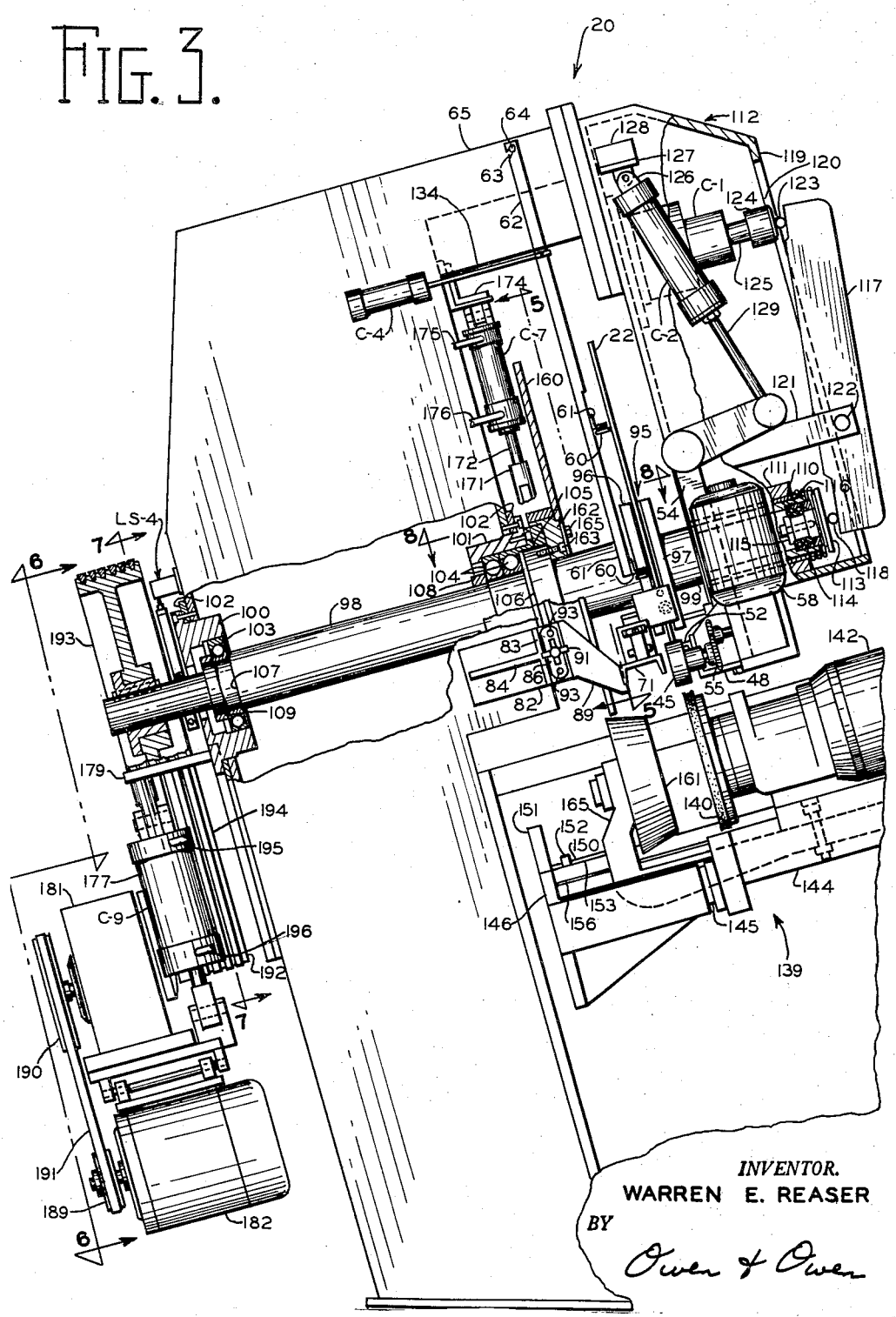
FIG. 3 is a fragmentary side view in elevation and partially in section, of the apparatus shown in FIG. 2.
Figure 4:
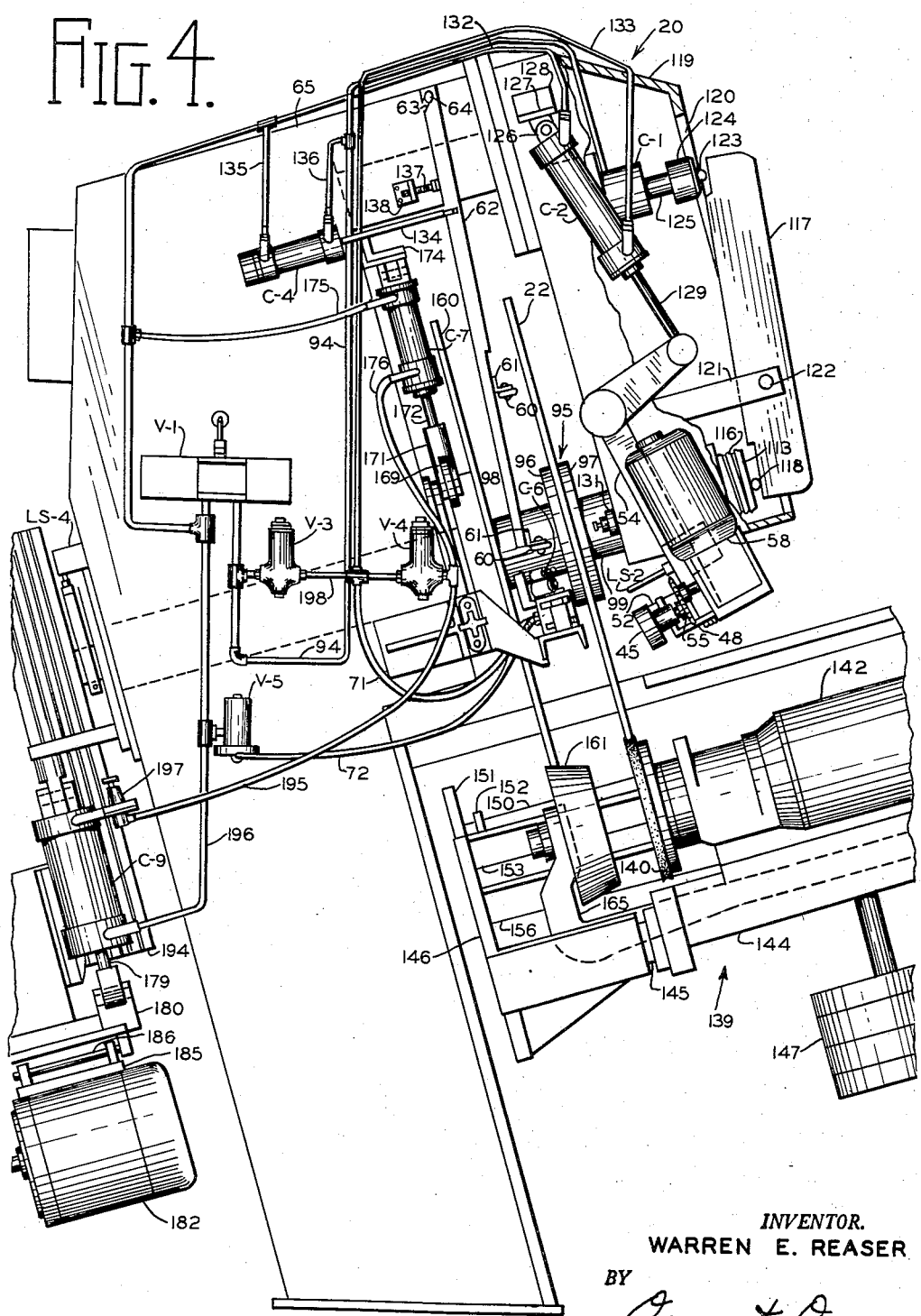
FIG. 4 is a fragmentary view in elevation taken from the position indicated by the line 4—4 of FIG. 2.

The mounting brackets 49 carry journals 51 at the outermost ends thereof for receiving shafts that carry the wheels 46 and 47. Tension on the belt 45 is regulated by moving the brackets 49 toward or away from each other, and the upper span of the belt 45 is supported by an angle iron 52 mounted on the support 48 as shown in FIGS. 3 and 4 while the lower span engages idler rollers 53 carried by the support 48 below the angle iron 52 as shown in FIG. 2. The support 48 is mounted upon the lowermost end of a pair of vertically depending L-shaped arms 54 that are mounted for pivotal movement to move the belt 45 out of glass engaging contact as shown in FIGS. 3 and 4 in a manner which will be described later in greater detail.

The shaft of the driving wheel 47 mounts a sprocket 55 which is driven by a chain 56 from a driving sprocket 57. Power is supplied to the sprocket 57 by an electric motor 58 mounted on a bracket 59 that is secured to the support 48 as shown in FIG. 8. A limit switch LS–2 is likewise mounted on the bracket 59, and tripping of this limit switch by the leading edge of the plate 22 actuates limit switch LS–1 whereby the belts 24 and 40 are stopped by the tripping of limit switch LS–1. Likewise as the belt 45 moves the plate 22 out of the grinder 20 after grinding limit switch LS–2 is released by the trailing edge of the plate which de-actuates limit switch LS–1 and starts belts 24 and 40.

The conveyor 44 is similar to conveyors 23 and 39 in that it utilizes idler rollers 60 mounted on angle irons 61 carried by a pair of vertically extending members 62. The glass plates 22 riding on the belt 45 are maintained in contact with the idler rollers 60 because the members 62 are tilted rearwardly as shown in FIG. 3. At the uppermost end of each vertically extending member 62 is a diagonal bayonet slot 63 adapted to receive a pin 64 that extends outwardly from a main frame 65 of the contour grinding machine 20, and the members 62 are pivoted about the pins 64 in a manner which will be described in greater detail to rotate the idler rollers 60 out of engagement with the surface of the glass plates 22.

The glass plate 22 is moved into the grinder 20 along the conveyor 44 until the leading edge of the plate 22 trips limit switch LS–2 and engages a gauge button 66 as well as a limit switch LS–3 shown in FIG. 10. The gauge button 66 prevents forward movement of the plate 22 along the belt 46, and tripping the limit switch LS–3 stops the motor 58 thereby stopping forward motion of the belt 45.

The limit switch LS–3 is electrically connected to a four-way double solenoid valve V–1 mounted on the side of the frame 65 as shown in FIG. 4. The valve V–1 controls a clamping cylinder C–1, two conveyor cylinders C–2 and C–3, two guide cylinders C–4 and C–5, a gauge cylinder C–6, a locking cylinder C–7, a support cylinder C–8 and a clutch cylinder C–9.

As shown in FIGS. 8 to 10, both the gauge button 66 and the limit switch LS–3 are rigidly mounted upon a horizontally extending arm 67 that is pivotally attached to a bar 68 by a pin 69 which extends through the bar 68 and one corner of the arm 67. The bar 68 is secured to the outermost end of a rod 70 which is reciprocally mounted in the double acting pneumatic clamping cylinder C–6. Referring to FIG. 4 as well as FIG. 8, air is admitted to the end of the cylinder C–6 adjacent the rod 70 through a line 71 for moving a piston contained therein that is attached to the rod 70 and retracting the rod 70. Likewise air is admitted to the opposite end of the cylinder C–6 through a line 72 for extending the rod 70.

The cylinder and rod assembly is mounted on a channel 73 by means of an inverted L-shaped support 74 that is bolted to the channel 73. One leg of the L-shaped support 74 has an aperture therein and this leg forms an eye portion which is received within a clevis 75 and is secured thereto by means of a pin 76 that extends through the apertures in the clevis 75 and the eye portion of the support 74.

A pin 77 extends through a second corner of the arm 67 at the same end as the pin 69, and the pin 77 rotates in bearings (not shown) that are mounted in a support 78 that is carried by the channel 73. As shown in FIG. 10, the support 78 has a slot formed therein to receive the portion of the arm 67 that carries the pin 77, and a cover 79 retains the bearings for the pin 77 in their proper position on each side of this slot. The pin 77 forms an axis about which the arm 67 rotates as the rod 70 moves from its retracted position shown in FIG. 8 to its extended position shown in FIG. 9 and the cylinder C–6 pivots about the pin 76.

As the rod 70 is retracted into the cylinder C–6 from the position shown in FIG. 9 to the position shown in FIG. 8, rotational movement of the arm 67 is limited by a stop plate 80 that is mounted on the forward surface of the support 78. The plate 80 has a diagonal surface 81 that engages the forward edge of the arm 67 to properly position the gauge button 66 and limit switch LS–3.

The channel 73 is connected to the frame 65 of the grinder 20 by a longitudinally extending mounting means comprising an end plate 82 and a forwardly directed plate 83 at right angles to one another which are connected by a gusset 84. As shown in FIG. 8, the end plate 82 is secured to a vertical surface of the frame 65 by means of bolts 85 which extend therethrough. On the opposite surface of the plate 83 from the gusset 85 there is mounted a pair of apertured brackets 86 which receive a threaded rod 87 that extends along the path of the belt 45 and is rotatable within the brackets 86.

The threaded rod 87 also passes through threaded apertures in a pair of bosses 88 that extend outwardly from a support 89 that is secured to the channel 73 by means of bolts 90. The threaded rod 87 is turned by means of a handle 91 which causes the support 89 to move along the path of the glass sheets 22. After the support 89 has been properly positioned along the threaded rod 87, a nut 92 is tightened against one of the bosses 88 to prevent further movement of the support 89. As shown in FIG. 3, the bosses 88 have aligned holes on each side of the rod 87 to receive support rods 93 which extend between the brackets 86 and through the bosses 88 to prevent rotation of the support 89 which slides therealong as the rod 87 is turned.

The tripping of limit switch LS–3 by the leading edge of a glass plate 22 moving along the conveyor 44 as it comes into contact with the gauge button 66 actuates the valve V–1. Actuation of the valve V–1 supplies air pressure through a line 94 to the clamping cylinder C–1 which actuates the glass gripping mechanism generally indicated at 95.

Referring to FIGS. 3 and 4, the glass gripping mechanism 95 includes a pair of generally circular table units 96 and 97 which comprise spaced plates that are mounted immediately adjacent the path of the glass plate 22 as it moves along the conveyor 44. The unit 97 is movable from an open position shown in FIG. 3 toward the unit 96 whereby each unit engages an oppositely disposed surface of the glass plate 22 as shown in FIG. 4. A suitable material such as waterproof canvas is clamped to the glass engaging surfaces of the units 96 and 97 to increase the effectiveness of the gripping mechanism 95.

The table unit 96 is located behind the conveyor 44 towards the main frame 65 and is spaced from the conveyor 44 a sufficient distance to enable the surface of the plate 22 which contacts the rollers 60 to clear the glass engaging surface of the table unit 96 as shown in FIG. 3.

The table unit 96 is mounted upon a main spindle 98 and is rotatable therewith. As shown in FIG. 2 clearance for the spindle 98 is provided in the conveyor 44 by dividing the lower angle iron 61 which intersects the center line of this spindle.

The forward table unit 97 is mounted upon a reciprocal spindle 99 in front of the conveyor 44 and is likewise rotatable with the spindle 99. In the glass receiving position shown in FIG. 3, the table unit 97 is moved forwardly from the table unit 96 to enable the glass plate 22 to pass therebetween until it contacts the gauge button 66. Thereupon in a manner which will be described latter in greater detail, the table unit 97 moves toward the table unit 96 and engages the glass plate 22 for support during the grinding operation. The members 62 are then pivoted to move the rollers 60 out of engagement with the surface of the plate 22 while the belt 45 is likewise pivoted out of engagement with the lowermost edge of the plate 22.

The spindle 98 is carried by a rear journal box 100 and a forward journal box 101 both of which are bolted to the frame 65 at areas that have been reinforced by plates 102. The rear journal 100 carries a single roller bearing 103 while the forward journal 101 carries a pair of bearings 104. Bearings 104 are forced towards a shoulder in the rear of the journal 101 by means of a retainer 105 that is bolted to the front of the journal 101. Endwise thrust of the spindle 98 toward the rear is resisted by a shoulder 106 which engages the outermost bearing 104 and by a face 107 at the rearward end which engages the bearing 103. End thrust in the opposite direction is resisted by a collar 108 on the spindle 98 which engages the innermost bearing 104 and a second collar 109 that engages the bearing 103 at the rearward end of the spindle 98.

As shown in FIG. 3, the spindle 99 comprises a hollow shaft which is rotatably and slidably mounted in a bearing 110 that is carried by a journal box 111 in the lowermost portion of a mounting bracket 112 that is secured to the frame 65 at its uppermost end. The table unit 97 of the gripping mechanism 95 is secured to one end of the spindle 99 while a cap assembly which transmits forces along the axis of the spindle 99 to cause reciprocation thereof is mounted on the opposite end. The cap assembly comprises a cover plate 113 that carries a set of ball bearings 114 which are mounted within the spindle 99. The inner race of the ball bearings 114 is maintained in contact with the cover plate 113 by means of a retainer plate 115 that is bolted to the cover plate 113. Thus, as the spindle 99 which carries the table unit 97 revolves within the bearing 110, the cover plate 113 remains stationary.

Resilient means in the form of a coil spring 116 which surrounds the outermost end of the spindle 99 and abuts against the bearing 110 at one end and the cover plate 113 at the other end urges the spindle 99 and the table unit 97 outwardly along its axis of rotation away from the surface of the glass plate 22.

The outwardly directed force of the spring 116 is overcome by a pivoted clamping arm 117 which, when it is desired to grip the glass plates 22, exerts a greater force on the opposite side of the cover plate 113. This force is maintained normal to the cover plate 113 by a substantially cylindrical force transmitting member 118 interposed between the cover plate 113 and the arm 117.

As shown in FIGS. 2 and 3 the mounting bracket 112 has a housing 119 with a vertically extending slot 120 formed in the center portion thereof, and the arm 117 is positioned within the slot 120. The arm 117 is pivoted on a pair of outwardly extending supports 121 in the slot 120 by means of a pivot pin 122 which extends through both the supports 121 and a bearing in the arm 117.

An outwardly directed force is imparted to the uppermost end of the arm 117 through a substantially cylindrical force transmitting member 123 mounted thereon by a bar 124 mounted on the end of a piston rod 125 that is reciprocally mounted in the pneumatic clamping cylinder C–1. As shown in FIGS. 2 and 4, the cylinder C–1 is mounted within the housing 119 of the mounting bracket 112, and upon admission of air into the cylinder C–1 the piston rod 125 is forced outwardly, thereby pivoting the arm 117 and imparting an inwardly directed force to the spindle 99.

As shown in FIG. 2, a pair of pneumatic conveyor cylinders C–2 and C–3, each having a clevis 126 on its upper end, is carried by the mounting bracket 112. Each clevis 126 is pivotally mounted on an eye 127 carried by a support bracket 128 which is rigidly secured to the housing 119. Extending outwardly from each cylinder C–2 and C–3 at the oppositely disposed end thereof from the clevis 126 is a piston rod 129. The lowermost end of each rod 129 is pivotally secured to the upper end of each arm 54, which, in turn, is pivotally mounted upon a boss 130 which extends outwardly from the housing 119. An adjustable stop plate 131 is also mounted on the housing 119 below each boss 130 to engage the arm 54 at one end of its swing.

In operation air is admitted to a line 132 that is connected to the uppermost end of each cylinder C–2 and C–3 which drives the piston rod 129 downwardly. This, in turn, pivots the arms 54 about each boss 130 until each arm 54 engages the stop plate 131. Thus the support 48, which carries the belt 45 is rotated to a glass engaging position shown in FIG. 3. Likewise the admission of air into a line 133 which is connected to the bottommost end of cylinders C–2 and C–3 swings the support 48 and the belt 45 out of glass engaging position as shown in FIG. 4.

The double acting conveyor cylinders C–4 and C–5 are mounted on the frame 65 directly behind the cylinders C–2 and C–3, and as shown in FIGS. 3 and 4 a piston rod 134 which extends from each cylinder C–4 and C–5 is pivotally secured to each member 62. Air under pressure is admitted to the rearward end of each cylinder C–4 and C–5 through a line 135 while air is admitted to the forward portion of each cylinder C–4 and C–5 through a second line 136 shown in FIG. 4. By admitting air to the line 135 the piston rod 134 is moved outwardly to its forwardmost position shown in FIG. 3 in which the rollers 60 engage a surface of the glass plate 22. The admission of air to the line 136 retracts the piston rod 134 to its rearward position shown in FIG. 4 in which the rollers 60 are moved out of glass engagement. Rearward movement of the member 62 is limited by an adjustable stop 137 secured to the frame 65 by a bracket 138.

As the plate 22 is rotated by the gripping mechanism 95, the downwardly moving portion of the edge of the plate 22 is ground by grinding means indicated by 139 in FIGS. 1–4. The grinding means 139 includes a pair of grinding wheels 140 and 141 shown in FIG. 2 that are driven by electric motors 142 and 143, respectively. The grinding wheels 140 and 141 are both aligned with the plate 22 when it is positioned in the gripping mechanism 95, and are rotatable about their normal axes which are not only parallel to one another but also parallel to the axis of rotation of the gripping mechanism 95. The grinding wheels 140 and 141 may either be identical or the wheel 140 which contacts the edge of the plate 22 first may be a rough grinding wheel while the plate 141 may be a finish grinding wheel.

The motors 142 and 143 and the grinding wheels 140 and 141 are mounted upon a support 144 which maintains the motors and grinding wheels in proper alignment. This support 144 is free to rotate about a rod 145 which extends therethrough substantially along the center line thereof between the motors 142 and 143, and the grinding wheels 140 and 141 can move relative to the edge of the glass plate 22 to adjust to the changes in contour of the plate.

As shown in FIG. 2, the rod 145 is mounted in the end of a frame 146, and counterweights 147 are secured to the underside of the support 144 by a bracket 148 which engages the rod 145. The counterweights 147 not only urge the grinding wheels 140 and 141 toward the edge of the glass plate 22, but also maintain these wheels above the support 144 between the glass plate and the frame 146.

The end of the frame 146 which is oppositely disposed from the support 144 is pivotally mounted on a wall of a control panel 149 located adjacent the rotary grinding machine 20. As shown in FIGS. 2 and 4, a rod 150 extends through ears 151 which are located at each side of the frame 146 and are secured to the wall of the control panel 149. The rods 150 also extend through ears 152 which extend outwardly from a cross brace 153 on the frame 146.

The grinding wheels 140 and 141 are yieldably held in edge grinding engagement with the downwardly directed edge of the glass plate 22 by the support cylinder C–8 that is pivotally mounted to the base of the control panel 149. A piston rod 154 extends outwardly from the upper end of the cylinder C–8, and the outermost end of the rod 154 is pivotally secured to the frame 146 by means of a bracket 155 that is secured to a centrally disposed portion of an intermediate cross member 156 on the frame 146. The pressure exerted upon the frame 144 is controlled by a valve V–2 located in an air supply line 157 between the cylinder C–8 and an accumulator tank 158 as shown in FIG. 1. A coolant is supplied the grinding wheels 140 and 141 through a line 159 that is connected to a suitable source of liquid coolant (not shown).

Figure 5:
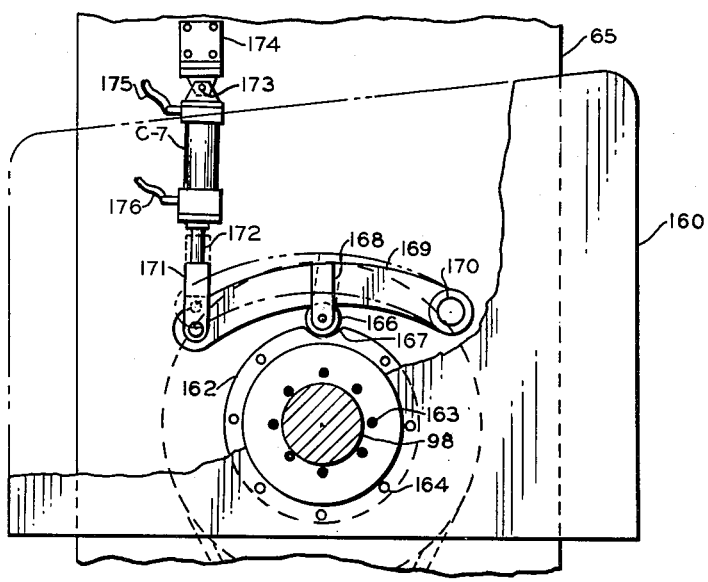
FIG. 5 is a fragmentary sectional view taken along the line 5—5 of FIG. 3.

The upwardly directed force of the piston rod 154 urges the frame 146 toward the plate 22 until a template 160 adjacent the gripping mechanism 95 is engaged by a pair of frusto-conical roller followers 161 shown in FIG. 4. The template 160 has a profile identical in contour and size with that of the finished ground plate and the counterweights 147 likewise serve to maintain the followers 161 in contact with the template 160. As shown in FIGS. 3, 5 and 8, the template 160 is secured to a collar 162 which has a circular central portion that is received in a mating hole in the template 160. The collar 162 is secured to the shoulder 106 on the spindle 98 by bolts 163 while the template 160 is mounted on the collar 162 by bolts 164. Thus as the spindle 98 rotates, the template 160 also rotates as shown by the dotted lines in FIG. 8 in synchronization with the gripping mechanism 95.

Each follower 161 has a spindle which is rotatably mounted on a substantially L-shaped arm 165 that is adjustably secured to the support 144 in such a fashion that a follower 161 is co-axial with each grinding wheel 140 and 141. As the spindle 98 turns in a counterclockwise direction as shown in FIG. 2, the template 160 which is in contact with the follower 161 moves the support 144 and the frame 146 downwardly against the hydraulic pressure in the cylinder C–8, and the grinding wheels 140 and 141 are moved through a path controlled by the engagement of each follower 161 with the template 160. Because each follower 161 is co-axial with a grinding wheel 140 or 141, the edge of the glass plate being ground is cut to a profile determined precisely by the template 160.

As the grinding wheels 140 and 141 are reduced in diameter because of wear, they would normally grind the plates 22 to a size larger than that of the template 160. The reductions in the diameters of the grinding wheels 140 and 141 are compensated for by axial adjustment of the followers 161, and this is accomplished by shifting the bracket 165 relative to the support 144. As the grinding wheels 140 and 141 become smaller in diameter their respective followers 161 are moved axially away from the wheels thereby reducing the diameter of the portion of each follower in contact with the template 160 by a similar amount.

The template 160 and the gripping mechanism 95 are properly positioned relative to the belt 45 by means of a roller 166 that is receivable within a slot 167 in the collar 162 to make certain that the corresponding edges of both the template 160 and the plate 22 lie in substantially the same planes when the plate 22 is clamped by the table units 96 and 97 and that the lower edge of the plate is substantially parallel to the upper surface of the belt 45 when the plate is released. When the roller 166 is received in the slot 167 at the end of a grinding cycle the plate 22 is properly positioned so that the belt 45 will engage the lowermost surface as it is swung from the position shown in FIG. 4 to the position shown in FIG. 3.

Likewise when the table units 96 and 97 are in a glass receiving position, the template 160 is properly oriented with respect to the incoming glass.

Referring to FIG. 5, the roller 166 is rotatably carried by bracket 168 which is mounted in the central portion of an arcuate indexing arm 169. One end of hte arm 169 is eccentrically mounted on a forwardly directed face of the frame 65 by means of a pin 170 that is secured thereto, while the oppositely disposed end of the arm 169 is pivotally mounted in the yoke 171 which, in turn, is connected to the end of a piston rod 172. The double acting locking cylinder C-7 carries a piston (not shown) that is connected to the opposite end of the rod 172 from the clevis 170, and the cylinder C-7 is pivotally mounted on the forwardly directed surface of the frame 65 by a pin 173 in a bracket 174.

Air is admitted to the top portion of the cylinder C-7 adjacent the bracket 174 through a line 175 shown in FIGS. 3 and 4 which forces the piston and the rod 172 downwardly to move the roller 166 into engagement with the peripheral surface of the collar 162, and when the slot 167 is positioned beneath the roller 166 the force exerted by the rod 172 onto the arm 169 forces the roller 166 into the slot 167. By admitting fluid into a second line 176 located at the bottom of the cylinder C-7, the piston (not shown) is driven upwardly thereby moving the rod 172 and yoke 171 upwardly which moves the arm 169 to the position shown by the dotted lines in FIG. 5, thereby withdrawing the roller 166 from the slot 167.

Figure 6:
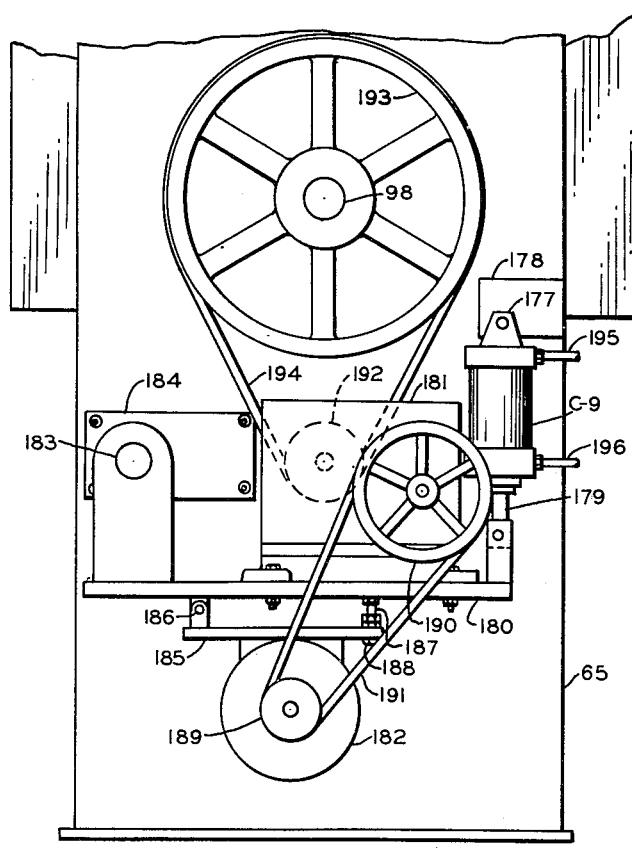
FIG. 6 is a fragmentary view in elevation taken along the line 6—6 of FIG. 3.
Figure 7:
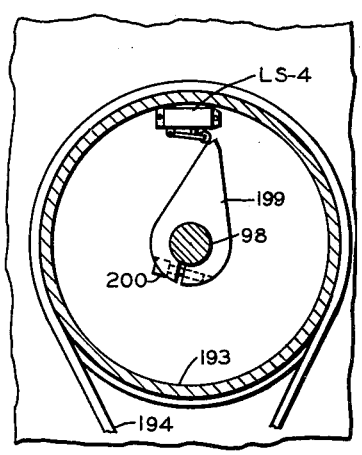
FIG. 7 is a fragmentary sectional view taken along the line 7—7 of FIG. 3.

Rotation of the spindle 98 and the gripping mechanism 95 through a complete revolution from the entry of the plate 22 into the gripping mechanism 95 to its discharge as a finished ground plate is controlled by a limit switch LS-4 shown in FIG. 7 and the clutch cylinder C-9 shown in FIG. 6. The upper end of the cylinder C-9 has a clevis 177 mounted thereon which is pivotally connected to the rearwardly directly surface of frame 65 by a bracket 178, and a rod 179 which is connected to a piston within the cylinder C-9 extends outwardly from the lower end thereof. The lowermost end of the rod 179 is pivotally connected to one end of a support 180 which has a gear box 181 mounted on its upwardly facing surface and a drive motor 182 supported on its downwardly facing surface. The end of the support 180 which is oppositely disposed from the rod 179 pivots about a pin 183 on a bracket 184 which is mounted on the frame 65 as shown in FIG. 6.

The motor 182 is adjustably secured to the lower surface of the support 180 by a bracket 185 having one end pivotally mounted on a pin 186 that is carried by the support 180 while the oppositely disposed end of the bracket 185 is secured to the support 180 by a threaded member 187 which extends through the bracket 185 and has a plurality of nuts 188 threadably mounted thereon.

The drive shaft of the motor 182 carries a drive pulley 189 which rotates an input pulley 190 on the gear box 181 by a belt 191. The tension of the belt 191 is regulated by pivoting the motor 182 about the pin 186 and securing it in position by means of the nuts 188 on the threaded member 187.

The gear box 181 has an output pulley 192 extending therefrom on the opposite side thereof from the input pulley 190 which rotates a drive pulley 193 on the spindle 98 by a plurality of belts 194 which engage both pulleys. The motor 182 constantly runs and continuously rotates both the input pulley 190 and the output pulley 192, but the spindle 98 is rotated only when tension is applied to the belts 194. Tension is applied to the belts 194 by rotating the support 180 about the pin 183, and this is accomplished by admitting air into the upper end of the cylinder C-9 through a line 195 to extend the rod 179. The rod 179 is retracted to release tension on the belts 194 by supplying air to the lower end of the cylinder C-9 through a line 196 shown in FIGS. 4 and 6. The amount of pressure applied to the upper end of the cylinder C-9, and consequently the tension of the belts 194, is controlled by a pressure regulator 197 located in the air line 195 as shown in FIG. 4.

The supply of air to both lines 195 and 196 is controlled by valve V-1 as shown in FIG. 4. The line 94 which actuates the clamping cylinder C-1 and the guide cylinders C-4 and C-5 is also connected to a first sequence valve V-3 which supplies air to the lines 71 and 133 through a line 198 to retract the gauge button 66 and the belt 45 after the glass plate 22 has been clamped and the rollers 60 have been retracted. The line 198 is connected to a second sequence valve V-4 which supplies air to lines 176 and 195 to apply tension to the belt 191 and retract the roller 166 after the belt 145 and the gauge button 66 have been retracted. Lines 175 and 196 are connected to the opposite sides of the valve V-1 to release the belts 191 and extend the roller 166 when the valve V-1 is shifted.

After air has been supplied to the line 195 from the sequence valve V-4, the cylinder C-9 is actuated to extend the rod 179 thereby applying tension to the belts 194. This in turn causes the pulley 192 to drive the pulley 193 and rotate the spindle 98 which, in turn, carries the template 160 as well as the glass plate 22 that is held by the gripping mechanism 95.

Referring to FIG. 7, a trip cam 199 is mounted on a spindle 98 and when the spindle 98 has rotated one complete revolution the trip cam 199 trips limit switch LS-4 which shifts valve V-1. This not only actuates the locking cylinder C-7 by supplying air to line 175, but also releases the tension from the belts 191 by supplying air to line 196 which stops the rotation of the pulley 193. The trip cam 199 and limit switch LS-4 are so located that the spindle 98 is declutched by actuation of the limit switch LS-4 just shortly prior to the completion of the full revolution and slightly before the roller 166 mates with the slot 167. By this declutching the spindle 98 is permitted to coast for the last few degrees of its rotation and can be stopped accurately by the registry of the roller 166 in the slot 167. The necessary coasting time is set by the position of the trip cam 199 on the spindle 98 and this is adjusted by loosening a screw 200 which permits free rotation of the trip cam 199 on the spindle 98.

Shifting of the valve V-1 by the tripping of limit switch LS-4 with the trip cam 199 supplies air to lines 132 and 135 which moves the rollers 60 into engagement with the surface of the glass plate 22 and rotates the belt 45 into engagement with the lower surface of the plate. When the belt 45 is rotated into engagement with the glass plate 22 pressure from the clamp cylinder C-1 is released and the gripping mechanism releases the glass plate 22 because of the tension of the spring 116. The belt 45 is started and the glass is removed from the grinder 20 onto a discharge conveyor 201 as shown in FIG. 1. As the glass moves along the belt 45 out of the grinder 20, the trailing edge releases the limit switch LS-2 which signals limit switch LS-1 that the grinder 20 will accept glass.

The conveyor 201 is similar to conveyors 23, 39 and 44 in that it comprises a belt 202 which engages the bottom edge of the glass plate 22 and idler rollers 203 which engage a surface of the plate. The idler rollers 203 are carried by angle irons 204 which are mounted on a frame 205 and tilted rearwardly in order to insure contact between the surface of the glass plate 22 and the rollers 203. The conveyor 201 moves the glass plates 22 along the production line for further processing through additional equipment such as washers.

In order to more fully disclose the invention, the operation of the automatic contour edge grinder of the invention will be described for the complete edge grinding of a glass plate 22. Assuming that there is no glass on the transfer conveyor 39 and that the limit switch LS-1 on this conveyor has not been tripped, a glass plate 22 is placed upon the loading conveyor 23 either automatically or manually. The glass plate 22 moves along the loading conveyor 23 through the bottom edge grinder 21 onto the transfer conveyor 39 until the leading edge of the glass plate 22 trips the limit switch LS–1 located at the end of the loading conveyor 39.

With limit switch LS–1 tripped, the feeding device for the conveyor 23 is signaled to prevent further plates from being placed thereon until the glass plate 22 enters into the contour edge grinder 20. If a plate is being ground in the grinder 20, the glass plate 22 will remain on the conveyor 39 until limit switch LS–2 is tripped by the finished ground plate as it leaves the grinder 20. However, if the grinder 20 is calling for glass, i.e., limit switch LS–2 has been released, the glass plate 22 will proceed directly onto the conveyor 44 and limit switch LS–1 will maintain belts 24 and 40 in motion and signal the handling device for loading the conveyor 23 that more glass is required.

The glass plate 22 enters the grinder 20 on conveyor 44 which maintains the lower edge of the plate 22 on the upper surface of the belt 45 and one surface is supported by rollers 60. The belt 45 moves the glass plate 22 along the conveyor 44 until the leading edge of the plate 22 trips limit switches LS–2 and LS–3 and engages the gauge button 66. The tripping of limit switch LS–2 signals limit switch LS–1 that a glass plate 22 is in the grinder 20 and consequently no additional plates are needed.

The tripping of limit switch LS–3 shifts valve V–1 which, in turn, supplies air to the line 94 that actuates not only cylinder C–4 and C–5 to swing the members 62 and consequently the rollers 60 out of engagement with the glass plate 22 but also the clamping cylinder C–1 to move the gripping mechanism 195 into clamping position shown in FIG. 4. Air pressure is maintained in lines 175 and 196 to make certain that there is no tension in the belts 191 and the roller 166 is in registry with the slot 167. Consequently there is no possibility of the spindle 98 rotating during the clamping of the glass plate 22 by the gripping mechanism 95.

Air is supplied to the sequence valve V–3 from the line 94 when the valve V–1 is shifted, and after the pistons in cylinders C–1, C–4 and C–5 have shifted air is introduced into the lines 198 and 71 which retracts the gauge button 66 as well as the limit switch LS–3. Air is also supplied from sequence valve V–3 to the line 133 through the line 198 to actuate the cylinders C–2 and C–3 to withdraw the belt 45 from beneath the glass plate 22. Sequence valve V–3 further supplies air to a sequence valve V–4 which, in turn, supplies pressure to the line 195 to actuate the clutch cylinder C–9 that tensions the belts 191 and rotates the spindle 98 as well as to the ine 176 which retracts the roller 166 from the slot 167.

After the glass plate 22 has been rotated for one revolution, limit switch LS–4 is tripped by the tripping cam 199 which shifts valve V–1 to supply air to lines 132, 135, 175 and 196. Pressure in the line 196 releases the tension in the belts 191 to stop the spindle drive while the pressure in line 175 actuates cylinder C–7 to move the roller 166 into engagement with the outer surface of the collar 162 and then into the slot 167. Pressure in the line 135 actuates cylinders C–4 and C–5 to move the rods 134 outwardly to a point where the rollers 60 contact the surface of the glass plate 122. Likewise pressure in the line 132 extends each rod 129 to rotate the belt 45 against the under surface of the plate 22.

When the belt 45 is placed beneath the lowermost surface of the plate 22, the clamp cylinder C–1 is actuated to withdraw the piston 125 and release the gripping mechanism 95. The belt 45 then moves the glass plates 22 from between the table units 96 and 97 of the gripping mechanism 95. The trailing edge of the plate 22 releases the limit switch LS–2 which energizes a valve V–5 to supply air pressure to the line 72 and shift the gauge button 66 through the gauge cylinder C–6. The release of limit switch LS–2 further signals limit switch LS–1 that the grinder 20 will accept more glass, and the glass plate 22 moves onto the conveyor 201.

I claim:

1. In a machine for grinding the contour edges of glass plates including a rotary glass holding clamp, means for opening and closing the clamp for receiving, holding and discharging glass plates, means for rotating the clamp about an axis substantially perpendicular to the surfaces of the glass plates when held by the clamp, at least one edge grinding wheel adapted to bear against the edge of a glass plate mounted in said clamp, and a template mounted for synchronous movement with the rotary glass holding clamp for controlling the path of the grinding wheel when a glass plate is held in a predetermined position in the clamp; the improvement comprising first means for engaging one edge of a glass plate and moving said plate into the clamp to the predetermined position along a path angularly disposed to the axis of rotation of said clamp; second means in said path for engaging another edge of said plate when said plate reaches said predetermined position and stopping movement of said first means; and third means for moving both said first means and said second means out of engagement with said plate after said plate is clamped in said predetermined position thereby enabling said plate to be rotated with said clamp.

2. Apparatus as claimed in claim 1, wherein said second means includes means for actuating said third means.

3. Apparatus as claimed in claim 1, wherein said second means includes means for actuating the means for opening and closing said clamp.

4. Apparatus as claimed in claim 1, including means for moving said first means into engagement with said plate after said clamp has rotated said plate against the grinding wheel and before said clamp is opened, and means for actuating said first means after said clamp is opened thereby discharging said plate along said path.

5. Apparatus as claimed in claim 4, including means for moving said second means into said path after said plate is discharged from said clamp by said first means.

6. Apparatus as claimed in claim 1, wherein said first means comprises a belt mounted for movement along a path substantially normal to the axis of rotation of said clamp, said belt having a span for contacting said one edge of said plate, and means for supporting said span whereby said plate is supported in said path of movement.

7. Apparatus as claimed in claim 1, wherein said second means comprises a member mounted for movement into and out of said path, and means for selectively moving said member along said path while positioned in said path.

8. In combination with a machine for grinding the contour edges of glass plates which includes at least one grinding wheel and a clamp having a pair of opposed members, one of the members being mounted for movement toward and away from the other of the members whereby facing surfaces of the members selectively contact oppositely disposed surfaces of the glass plate means for moving the grinding wheel into engagement with the edges of the plates, and means for rotating the members about an axis which is substantially normal to the engaging surfaces and which is angularly disposed to vertical; means for supporting said plates in a position which is substantially normal to said axis and moving said plates into and out of said clamp, said means including means for engaging one of said oppositely disposed surfaces of each of said plates and supporting said plate in said position, and means for moving said surface engaging means out of engagement with said plate when said members are in engagement with said oppositely disposed surfaces.

9. Apparatus as claimed in claim 8, wherein the machine includes a frame which mounts the clamp and said surface engaging means comprises a plurality of rollers for engaging said surface, at least one member pivotally mounted on said frame, means for mounting said rollers on said member, and means for swinging said member to a first position wherein said rollers engage said surface and a second position wherein said rollers are out of engagement with said surface.

10. In a machine for grinding the contour edges of glass plates including at least one edge grinding wheel adapted to bear against the edge of a glass plate, a pair of spaced members for clamping a glass plate by engaging oppositely disposed surfaces of the plate, and a template for controlling the path of the grinding wheel when a glass plate is clamped by the spaced members, the improvement comprising a shaft mounted for rotation on an axis perpendicular to the engaged surfaces of the glass plates and having one end secured to one of the spaced members for rotating said members, a collar rigidly secured to said shaft for mounting the template, and means for positively engaging said collar at a predetermined point during the rotation of said shaft to properly position the template relative to the plate.

11. In a machine for grinding the contour edges of glass plates including at least one edge grinding wheel adapted to bear against the edge of a glass plate, a pair of spaced members for clamping a glass plate by engaging oppositely disposed surfaces of the plate, and a template for controlling the path of the grinding wheel when a glass plate is clamped by the spaced members, the improvement comprising a shaft extending outwardly from one of the spaced members normal to the glass engaging surfaces thereof, drive means for rotating said shaft about its normal axis when a glass plate is engaged by the spaced mmebers to rotate the glass plate into engagement with the grinding wheel, first actuating means for starting said drive means after a glass plate is clamped by the spaced members and stopping said drive means after the plate has been rotated for one revolution against the grinding wheel, a collar having a slot therein being secured to said shaft adjacent the spaced members, said template being secured to said collar, a braking member for positively engaging said collar in said slot to stop rotation of said shaft, and second actuating means operatively associated with said first actuating means for withdrawing said braking member prior to the starting of the drive means.

12. Apparatus for grinding the edges of a glass plate to a predetermined contour, one of the edges being subsequently contained by a frame, said apparatus comprising a loading conveyor for moving the glass plate along a path which is angularly disposed to horizontal, handling means for placing the glass plate on said loading conveyor at one end thereof, first grinding means positioned at the oppositely disposed end of said loading conveyor for rough grinding said one edge while the plate is moved along said path, a transfer conveyor extending along said path on the opposite side of said first grinding means from said loading conveyor for moving the plate out of said first grinding means along said path, second grinding means positioned at the oppositely disposed end of said transfer conveyor for finish grinding the remaining edges of the plate while the plate is rotated about an axis substantially normal to said path, plate engaging means for moving the plate into and out of said second grinding means along said path, and a discharge conveyor extending along said path on the opposite side of said second grinding means from said transfer conveyor for removing the plate from the plate engaging means along said path.

13. Apparatus as claimed in claim 12, including first sensing means on said transfer conveyor adjacent said second grinding means for signaling said handling means when the plate has reached the end of said transfer conveyor adjacent said second grinding means, and second sensing means on said second grinding means for actuating said first sensing means when a plate is in said second grinding means, and said first sensing means including means for stopping both said loading conveyor and said transfer conveyor when said first sensing means is actuated by said second sensing means and a plate has reached said end of said transfer conveyor.

References Cited in the file of this patent

UNITED STATES PATENTS

| 2,597,180 | Reaser et al. | May 20, 1952 |
| 2,826,007 | Reaser | Mar. 11, 1958 |
| 2,826,872 | Robins | Mar. 18, 1958 |
| 2,883,800 | Reaser et al. | Apr. 28, 1959 |